(12) United States Patent
Childs, Jr. et al.

(10) Patent No.: US 7,629,528 B2
(45) Date of Patent: Dec. 8, 2009

(54) SYSTEM AND METHOD FOR MUSICAL SONIFICATION OF DATA

(75) Inventors: Edward P. Childs, Jr., Norwich, VT (US); James C. Perkins, Hopkinton, NH (US); John Graham Brooks, Norwich, VT (US)

(73) Assignee: Soft Sound Holdings, LLC, Etna, NH (US)

( * ) Notice: Subject to any disclaimer, the term of this patent is extended or adjusted under 35 U.S.C. 154(b) by 0 days.

(21) Appl. No.: 12/125,538

(22) Filed: May 22, 2008

(65) Prior Publication Data

US 2009/0000463 A1 Jan. 1, 2009

Related U.S. Application Data

(63) Continuation of application No. 11/457,584, filed on Jul. 14, 2006, which is a continuation of application No. 10/446,452, filed on May 28, 2003, now Pat. No. 7,138,575.

(60) Provisional application No. 60/399,284, filed on Jul. 29, 2002.

(51) Int. Cl.
*G10H 1/00* (2006.01)
(52) U.S. Cl. .............................. 84/609; 84/615; 84/600
(58) Field of Classification Search ........... 84/600–609, 84/615; 700/94
See application file for complete search history.

(56) References Cited

U.S. PATENT DOCUMENTS

| | | | |
|---|---|---|---|
| 4,504,933 A | 3/1985 | Janney | |
| 4,576,178 A | 3/1986 | Johnson | |
| 4,653,498 A | 3/1987 | New, Jr. et al. | |
| 4,785,280 A | 11/1988 | Fubini et al. | |
| 4,812,746 A | 3/1989 | Dallas, Jr. | |
| 4,996,409 A | 2/1991 | Paton et al. | |
| 5,095,896 A | 3/1992 | Omoigui | |
| 5,285,521 A | 2/1994 | Holt et al. | |
| 5,293,385 A | 3/1994 | Hary | |
| 5,360,005 A | 11/1994 | Wilk | |
| 5,371,854 A | 12/1994 | Kramer | |
| 5,508,473 A | 4/1996 | Chafe | |
| 5,537,641 A | 7/1996 | De Vitoria Lobo et al. | |
| 5,606,144 A | 2/1997 | Dabby | |
| 5,675,708 A | 10/1997 | Fitzpatrick et al. | |
| 5,730,140 A | 3/1998 | Fitch | |

(Continued)

FOREIGN PATENT DOCUMENTS

WO  03107121  12/2003

OTHER PUBLICATIONS

Berger, "Remapping Sensory Data", The Center for Computer Research in Music and Acoustics—Stanford University, Apr. 21, 2003.

(Continued)

*Primary Examiner*—David S. Warren
(74) *Attorney, Agent, or Firm*—Grossman Tucker Perreault & Pfleger, PLLC

(57) ABSTRACT

A musical sonification system and method sonifies data, such as real-time financial market data, to produce an audio signal output including a musical rendering of the data. A sonification engine converts the data into sound parameters based on configuration data and a sonification and mapping scheme. A sound generator generates the audio output signal from the sound parameters.

15 Claims, 15 Drawing Sheets

U.S. PATENT DOCUMENTS

| | | | |
|---|---|---|---|
| 5,798,923 | A | 8/1998 | Laskowski |
| 5,801,969 | A | 9/1998 | Nagahama |
| 5,836,302 | A | 11/1998 | Homuth et al. |
| 5,923,329 | A | 7/1999 | Beale |
| 6,000,833 | A | 12/1999 | Gershenfeld et al. |
| 6,009,394 | A * | 12/1999 | Bargar et al. ............... 704/258 |
| 6,083,163 | A | 7/2000 | Wegner et al. |
| 6,088,675 | A | 7/2000 | MacKenty et al. |
| 6,137,045 | A | 10/2000 | Short et al. |
| 6,243,663 | B1 | 6/2001 | Baty et al. |
| 6,283,763 | B1 | 9/2001 | Matsuzaki et al. |
| 6,296,489 | B1 | 10/2001 | Blass et al. |
| 6,356,860 | B1 | 3/2002 | Barnette |
| 6,442,523 | B1 | 8/2002 | Siegel |
| 6,449,501 | B1 | 9/2002 | Reuss |
| 6,505,147 | B1 | 1/2003 | Kumashiro |
| 6,516,292 | B2 | 2/2003 | Yahalom |
| 7,138,575 | B2 | 11/2006 | Childs |
| 2002/0002458 | A1 | 1/2002 | Owen et al. |
| 2002/0156807 | A1 | 10/2002 | Dieberger |
| 2002/0177986 | A1 | 11/2002 | Moeckel et al. |
| 2004/0133500 | A1 | 7/2004 | Thompson et al. |
| 2004/0243016 | A1* | 12/2004 | Sanderson et al. .......... 600/532 |
| 2005/0055267 | A1 | 3/2005 | Chasanoff et al. |
| 2006/0224888 | A1* | 10/2006 | Mansz et al. ................ 713/168 |
| 2006/0247995 | A1 | 11/2006 | Childs |
| 2008/0046246 | A1* | 2/2008 | Goldstein et al. ........... 704/258 |
| 2008/0269633 | A1* | 10/2008 | Watson ........................ 600/544 |
| 2009/0013254 | A1* | 1/2009 | Walker et al. ............... 715/727 |

OTHER PUBLICATIONS

Voss, "Science and the Art of Fractals: Appealing to the Senses of Sight and Sound", The Graduate Center, The City University of New York, Nov. 5, 2001.

Nesbitt, et al., "Evaluation of a Multimodal Sonification and Visualization of Depth of Stock Market Data", Proceedings of ICAD, Tokyo, Jul. 2, 2002.

Sonification of Complex Data sets: ex. from a basketball viewed online Mar. 10, 2005] www.csee.wvu.edu/~vanscoy/vsmm99/webmany/FLVS11.htm.

Marketbuzz: Sonification of real-time market data [viewed online Mar. 10, 2005] www.icad.org.

Muse: A Musical Data Sonification Toolkit; ICAD conference proceedings, 1997, www.icad.org.

Sonification of Daily weather records [viewed online Mar. 10, 2005] 2001 proceedings, www.icad.org.

Settel, et al., Real-time Timbral Transformation: FFT-based Resynthesis, 1994, [viewed online Jul. 26, 2005] http://www.music.buffalo.edu/lippe/pdfs/fft.pdf.

CME—Chicago Mercantile Exchange—website print-out, Trade CME Products, E-quotes.

Real-time Timbral Transformation: FFT-based Resynthesis. 1994. By Zack Settel and Cort Lippe. [viewed online on Jul. 26, 2005] http://www.music.buffalo.edu/lippe/pdfs/fft.pdf.

Mapping a single data stream to multiple auditory variables . . . , [online], [retrieved Mar. 10, 2005). <URL:http://www.icad.org> Proceedings ICAD conference 1996.

Accentus (tm) www.accentus.com [viewed online], [retrieved Mar. 10, 2005].

Rock Around the Bow Shock [online], [retrieved Mar. 10, 2005]0 owww-ssg.sr.unh.edultof/Outreach/music/c1uster/.

Music from the Ocean [online], [retrieved Mar. 10, 2005]0 owww.composerscientist.com/csr.html.

Chinese Office Action dated Dec. 12, 2008 issued in related Chinese Patent Application No. 03821896.8.

* cited by examiner

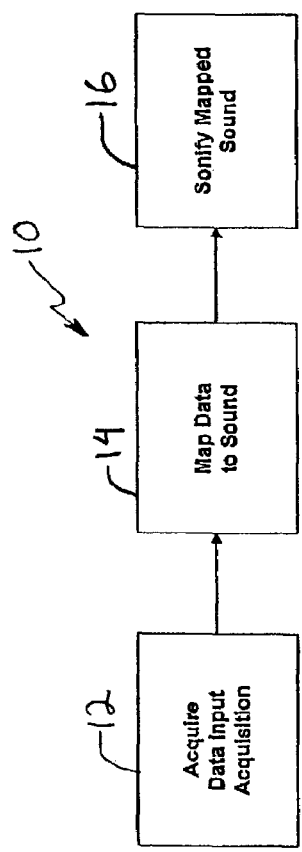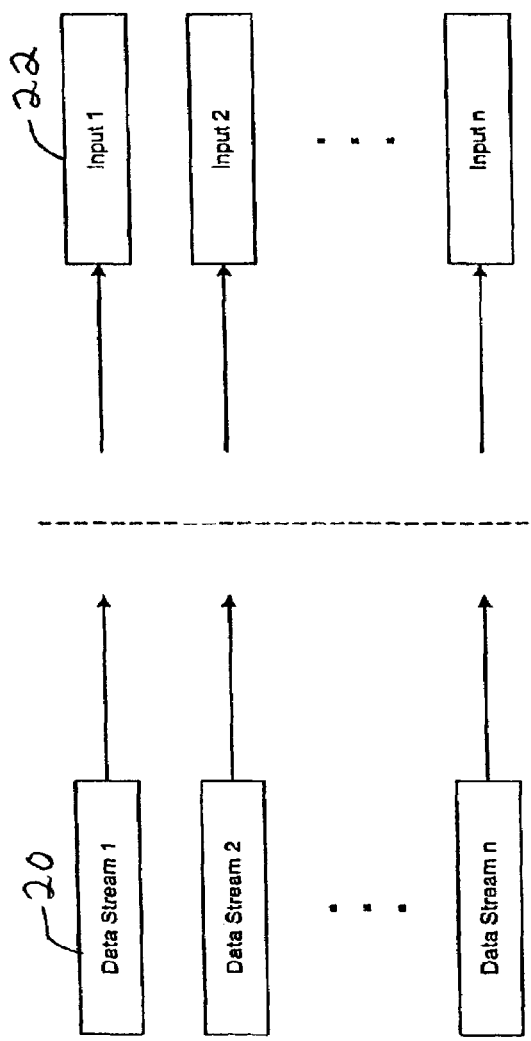

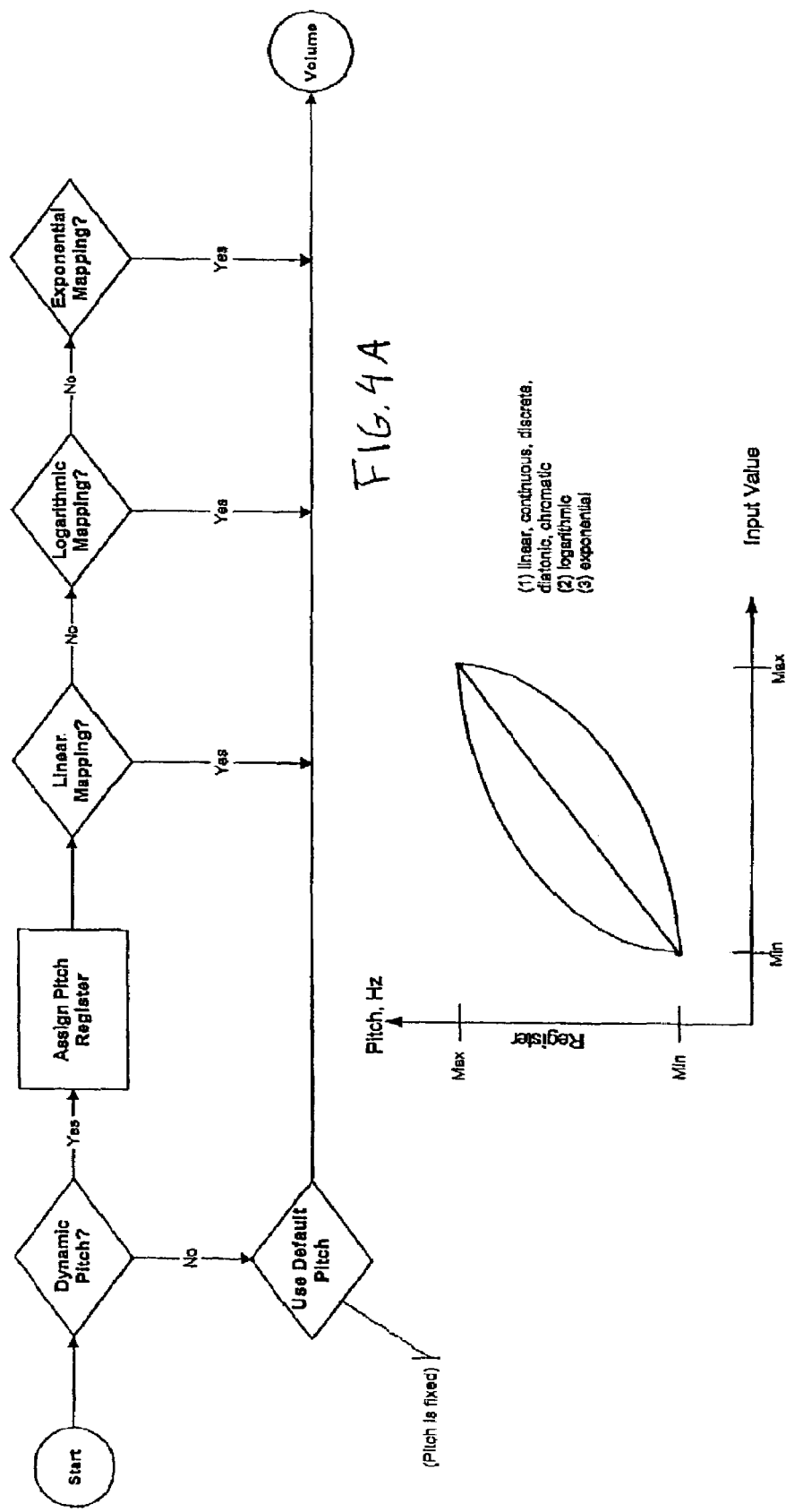

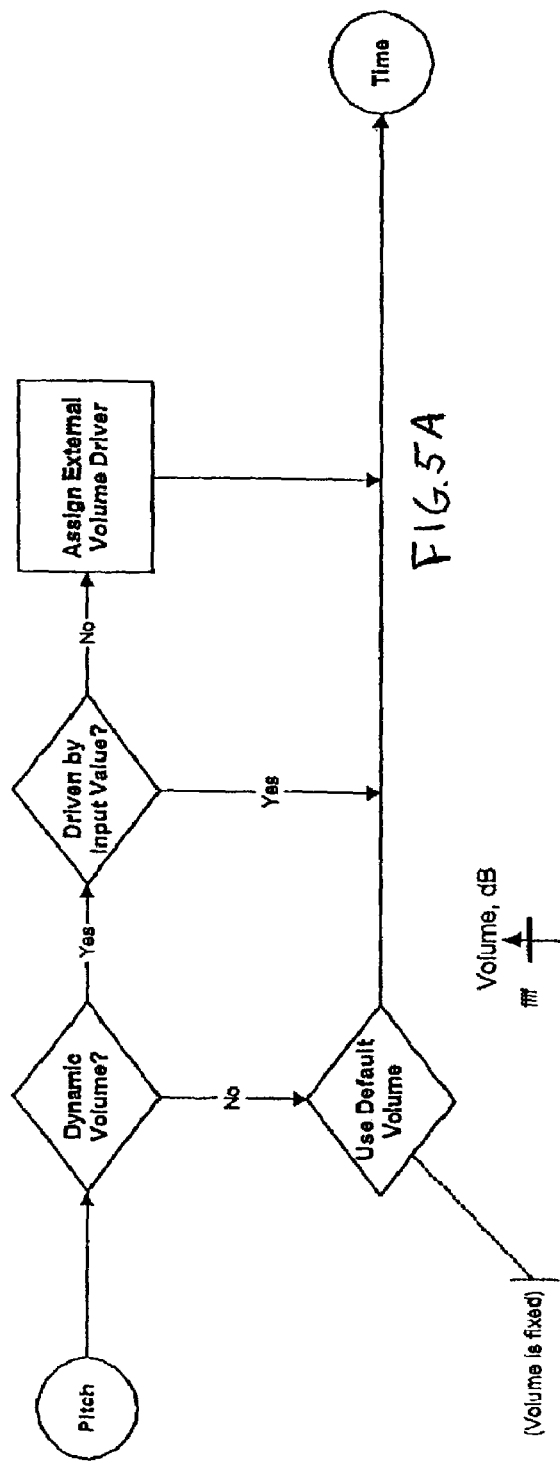
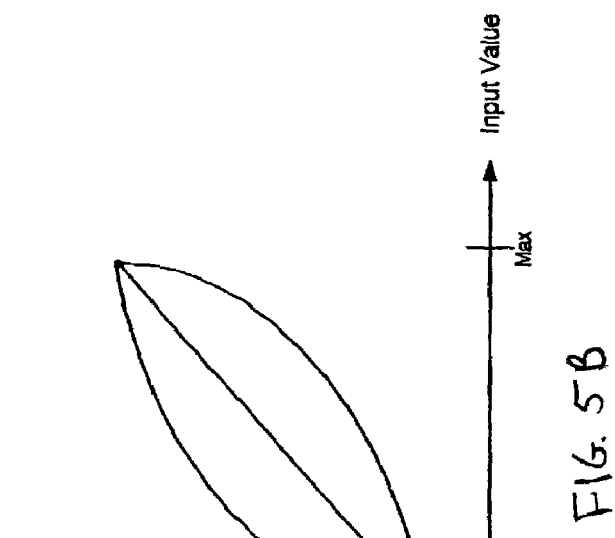
FIG. 5A
FIG. 5B

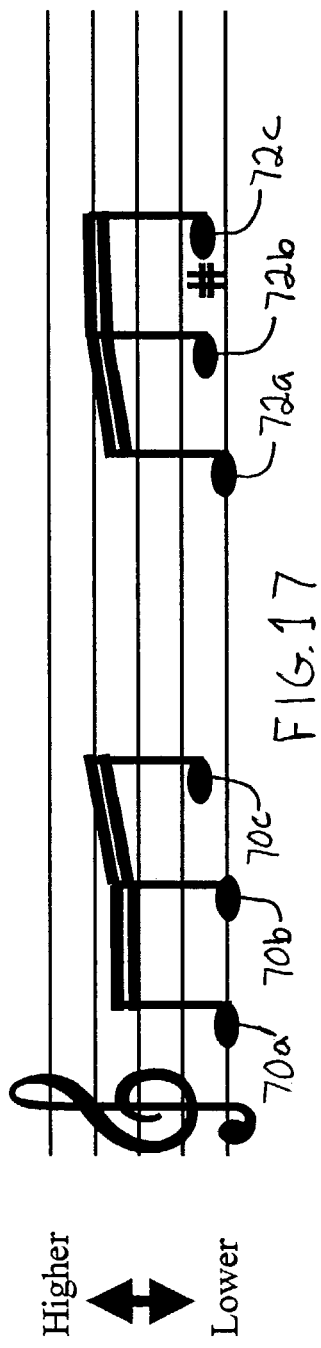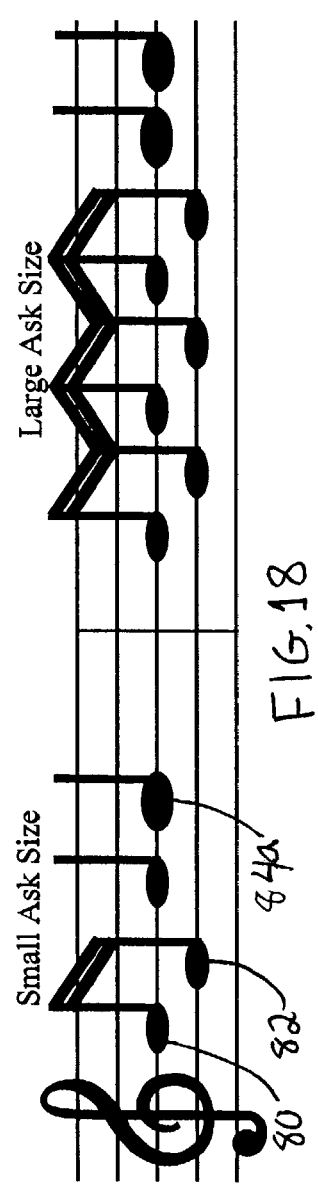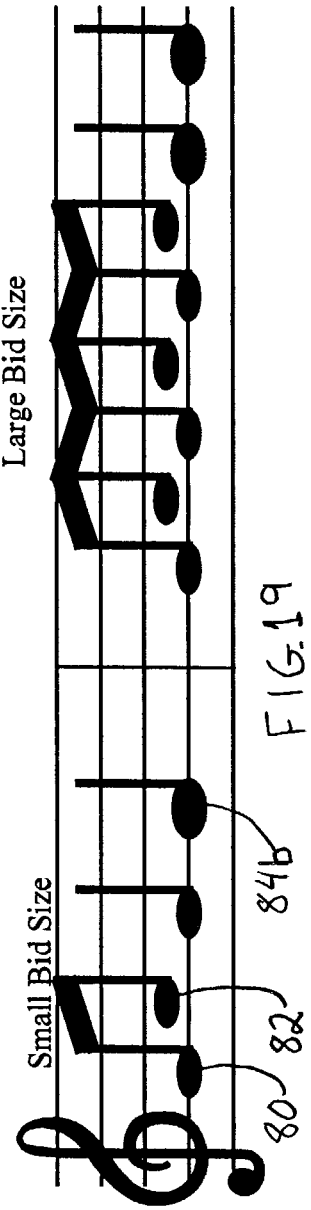

US 7,629,528 B2

SYSTEM AND METHOD FOR MUSICAL SONIFICATION OF DATA

CROSS-REFERENCE TO RELATED APPLICATIONS

This application is a continuation of co-pending U.S. patent application Ser. No. 11/457,584, filed Jul. 14, 2006, which is a continuation of U.S. patent application Ser. No. 10/446,452, filed on May 28, 2003, now U.S. Pat. No. 7,138,575, which claims the benefit of U.S. Provisional Patent Application Ser. No. 60/399,284, filed on Jul. 29, 2002, all of which are fully incorporated herein by reference.

TECHNICAL FIELD

The present invention relates to sonification of data and more particularly, to a system and method for musical sonification of a stream of complex data such as financial market data.

BACKGROUND INFORMATION

For centuries, printed visual displays have been used for displaying information in the form of bar charts, pie charts and graphs. In the information age, visual displays (e.g., computer monitors) have become the primary means for conveying large amounts of information. Computers with visual displays, for example, are often used to process and/or monitor complex numerical data such as financial trading market data, fluid flow data, medical data, air traffic control data, security data, network data and process control data. Computational processing of such data produces results that are difficult for a human overseer to monitor visually in real time. Visual displays tend to be overused in real-time data-intensive situations, causing a visual data overload. In a financial trading situation, for example, a trader often must constantly view multiple screens displaying multiple different graphical representations of real-time market data for different markets, securities, indices, etc. Thus, there is a need to reduce visual data overload by increasing perception bandwidth when monitoring large amounts of data.

Sound has also been used as a means for conveying information. Examples of the use of sound to convey information include the Geiger counter, sonar, the auditory thermometer, medical and cockpit auditory displays, and Morse code. The use of non-speech sound to convey information is often referred to as auditory display. One type of auditory display in computing applications is the use of auditory icons to represent certain events (e.g., opening folders, errors, etc.). Another type of auditory display is audification in which data is converted directly to sound without mapping or translation of any kind. For example, a data signal can be converted directly to an analog sound signal using an oscillator. The use of these types of auditory displays have been limited by the sound generation capabilities of computing systems and are not suited to more complex data.

Sonification is a relatively new type of auditory display. Sonification has been defined as a mapping of numerically represented relations in some domain under study to relations in an acoustic domain for the purposes of interpreting, understanding, or communicating relations in the domain under study (C. Scaletti, "Sound synthesis algorithms for auditory data representations," in G. Kramer, ed., International Conference on Auditory Display, no. XVIII in Studies in the Sciences of Complexity, (Jacob Way, Reading, Mass. 01867), Santa Fe Institute, Addison-Wesley Publishing Company, 1994.). Using a computer to map data to sound allows complex numerical data to be sonified.

Applications of sonification have been most common in the medical field, for example, as disclosed in U.S. Pat. Nos. 6,449,501; 6,283,763; 6,083,163; 5,836,302; and 5,730,140, which are incorporated herein by reference. Applications of sonification have been limited in other fields. One example of sonification applied to stock market data is disclosed in U.S. Pat. No. 5,371,854 to Kramer, which is incorporated herein by reference. Kramer discloses a sonification system using auditory beacons as references for comparison and orientation in data. Other attempts at sonification of stock market data include work by Keith Nesbitt and Stephen Barrass published on Jul. 2-5, 2002 and entitled "Evaluation of a Multimodal Sonification and Visualization of Depth of Stock Market Data," given at the Proceedings of ICAD, Tokyo, 2002, in which vocalized alerts were used to indicate "buy" and "sell" in a trading system. A work by Jonathon Berger of CCRMA, Stanford, published on the web at Stanford University at http://www-ccrma.stanford.edu/groups- /soni/index.html, discloses sonification of historical financial data using pulses of filtered noise, one pulse for each trading day.

The human ability to recognize patterns in sound presents a unique potential for the use of auditory displays. Patterns in sound are recognized over time, and a departure from a learned pattern results in an expectation violation. For example, individuals establish a baseline for the "normal" sound of a car engine and can detect a problem when the baseline is altered or interrupted. Also, the human brain can process voice, music and natural sounds concurrently and independently. Music, in particular, has advantages over other types of sound with respect to auditory cognition and pattern recognition. Musical patterns are implicitly learned, recognizable even by non-musicians, and aesthetically pleasing.

The existing auditory displays have not exploited the true potential of sound, and particularly music, as a way to increase perception bandwidth when monitoring data. U.S. Pat. No. 5,371,854, for example, does not disclose a sonification that is based on music and specifically common-practice music. Kramer relies solely on the use of beacons to discern trends in data rather than the ability to recognize musical patterns. Thus, existing sonification techniques do not take advantage of the auditory cognition attributes unique to music.

Accordingly, there is a need for a musical sonification system and method that is capable of increasing data perception bandwidth by using musical patterns.

BRIEF DESCRIPTION OF THE DRAWINGS

These and other features and advantages will be better understood by reading the following detailed description, taken together with the drawings wherein:

FIG. 1 is a functional block diagram of a system and method for sonification of a data stream, according to one embodiment of the present invention.

FIG. 2 is a functional block diagram of one embodiment of the data input acquisition.

FIGS. 4-12 are flow charts and graphs illustrating examples of how different types of sound parameters can be mapped.

FIGS. 17-20 illustrate musical notations for specific examples of sonification and mapping schemes.

DETAILED DESCRIPTION

Figure 3:
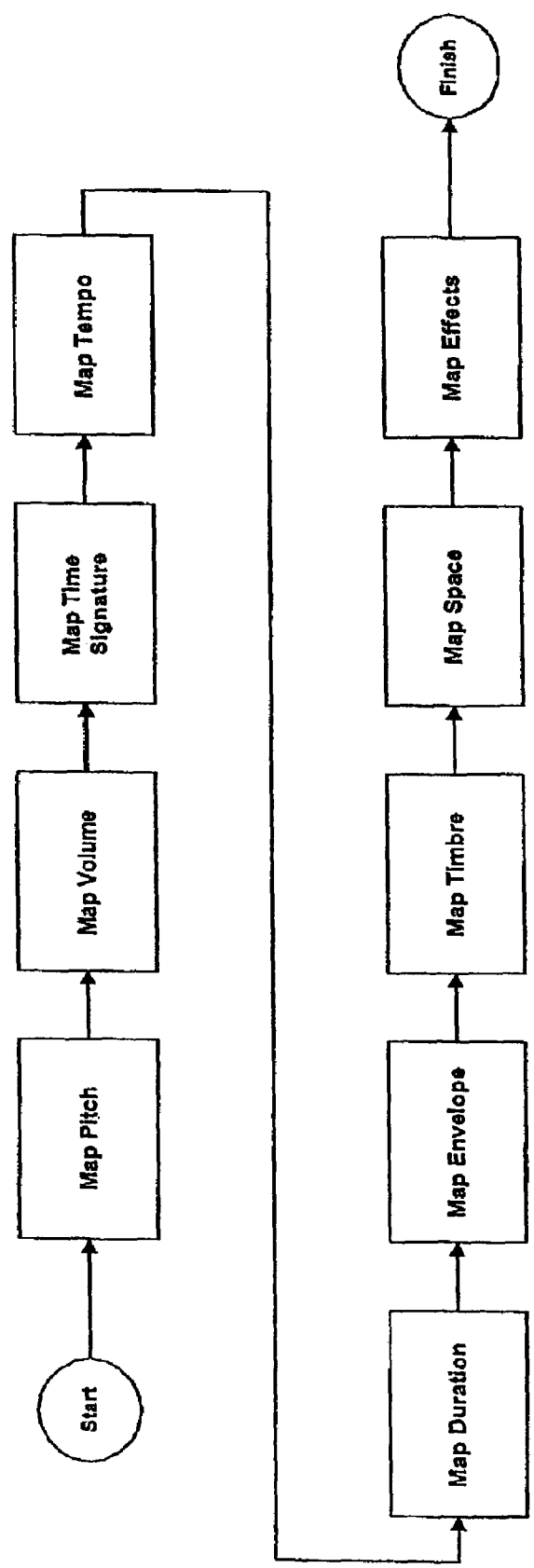
FIG. 3 is a flow chart illustrating one embodiment of mapping data to sound parameters.
Figure 6A:
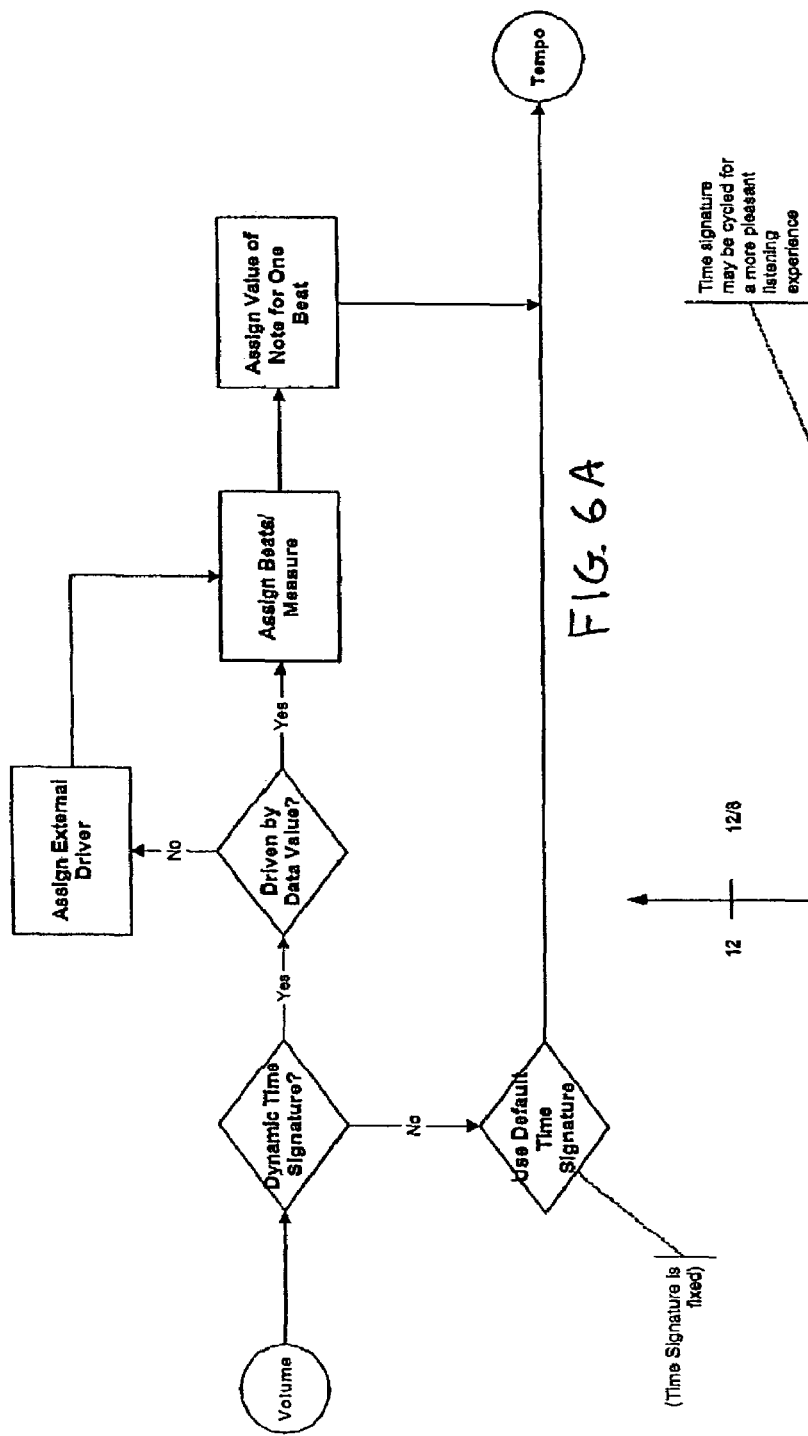
Figure 6B:
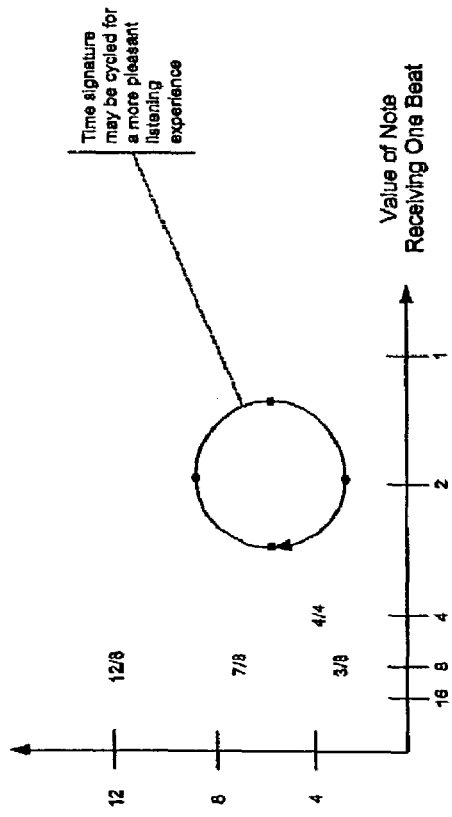
Figures 7A, 7B:
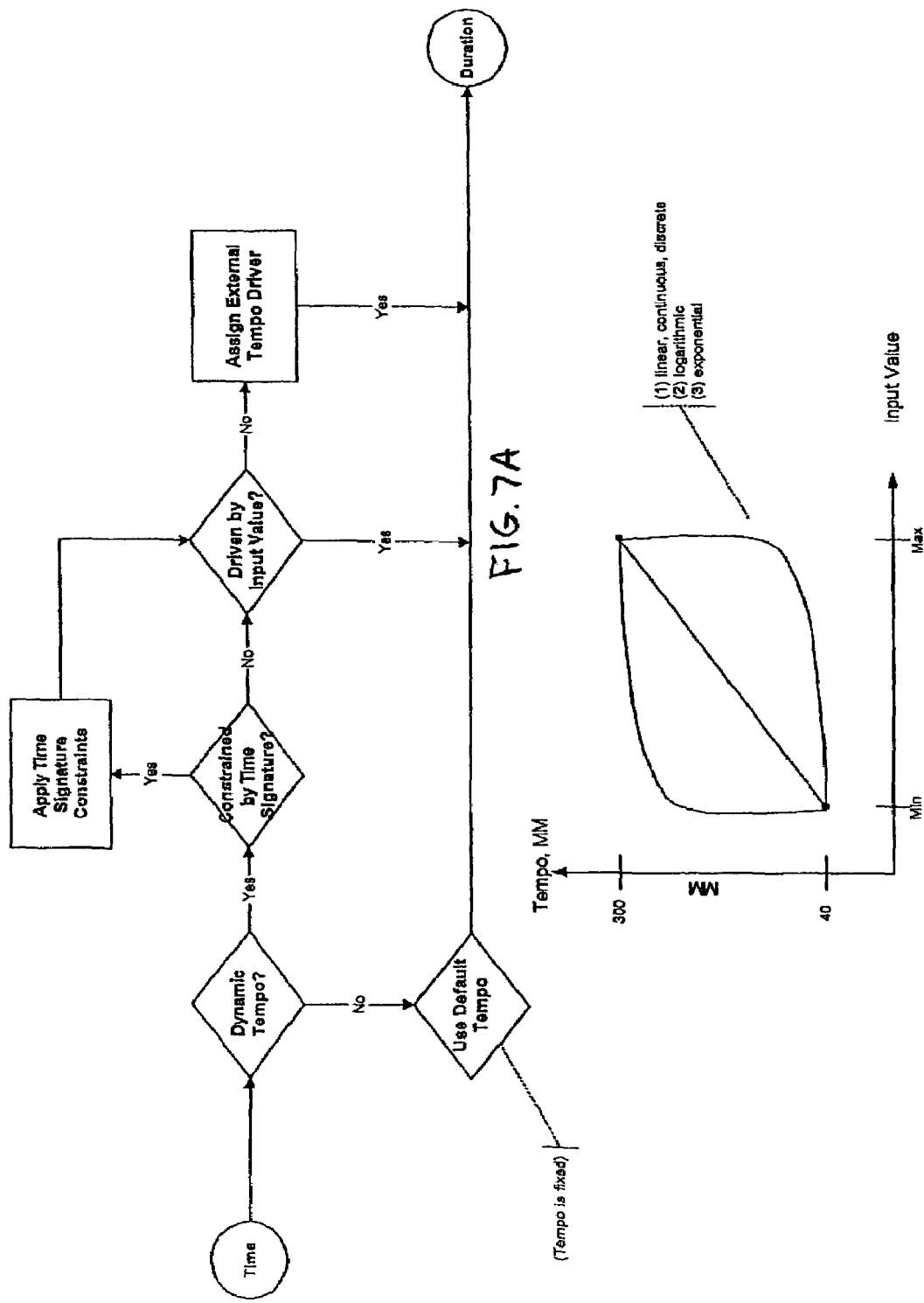
Figure 8A:
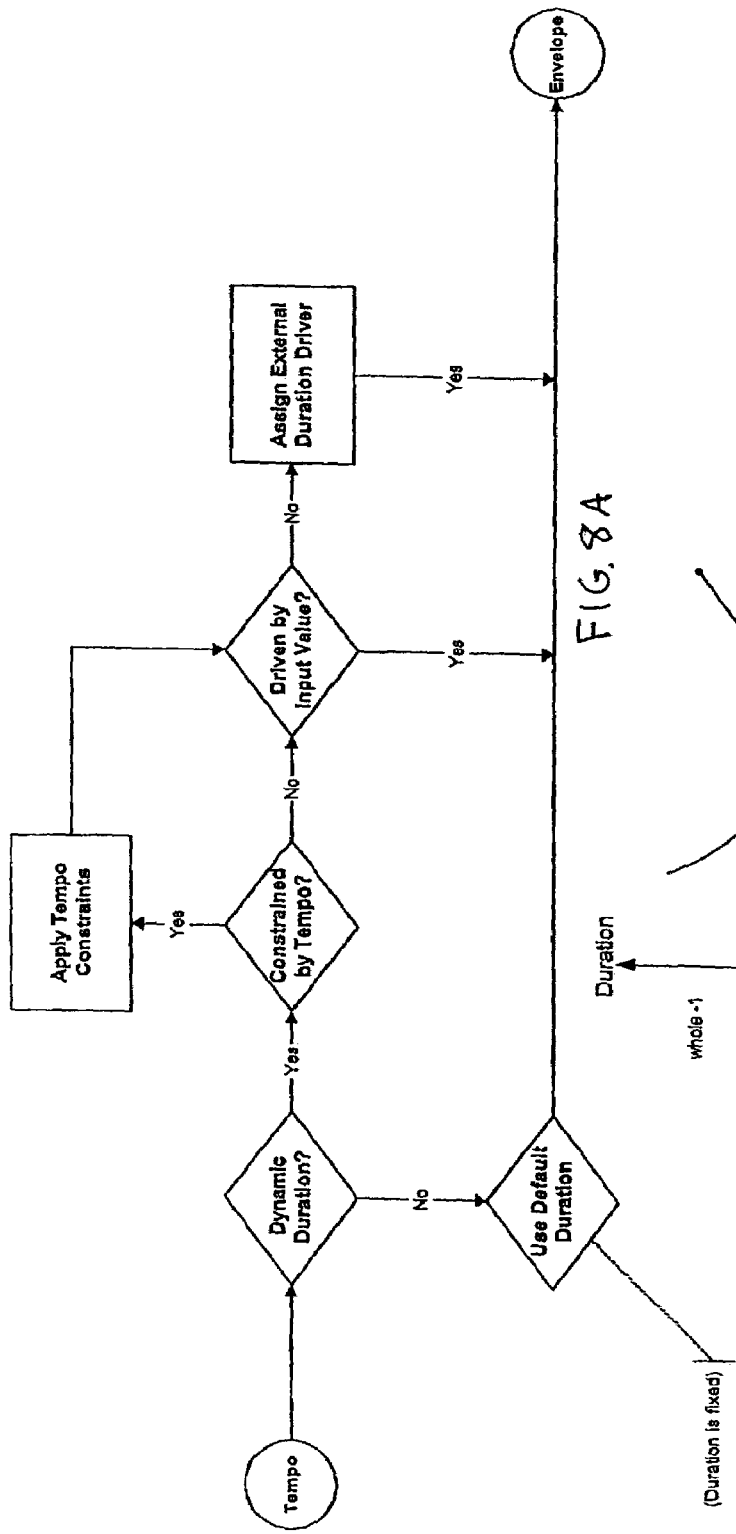
Figure 8B:
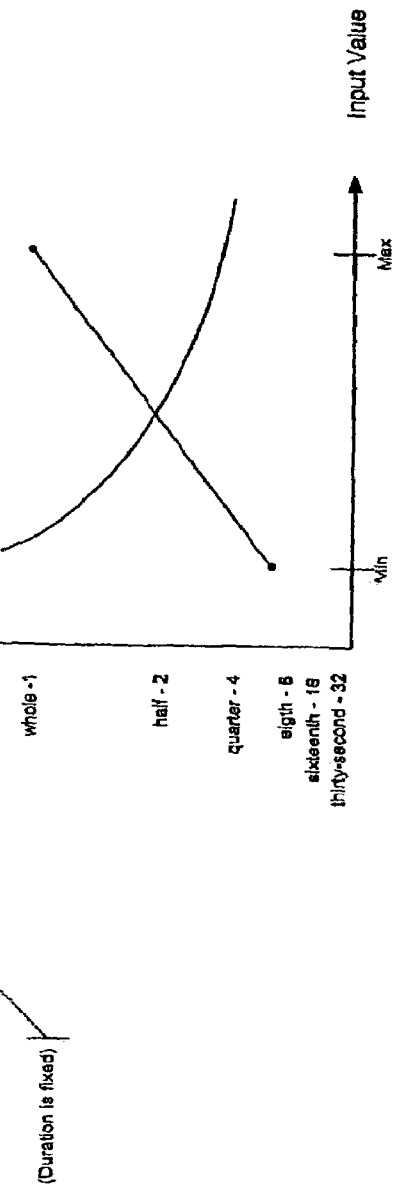
Figure 9A:
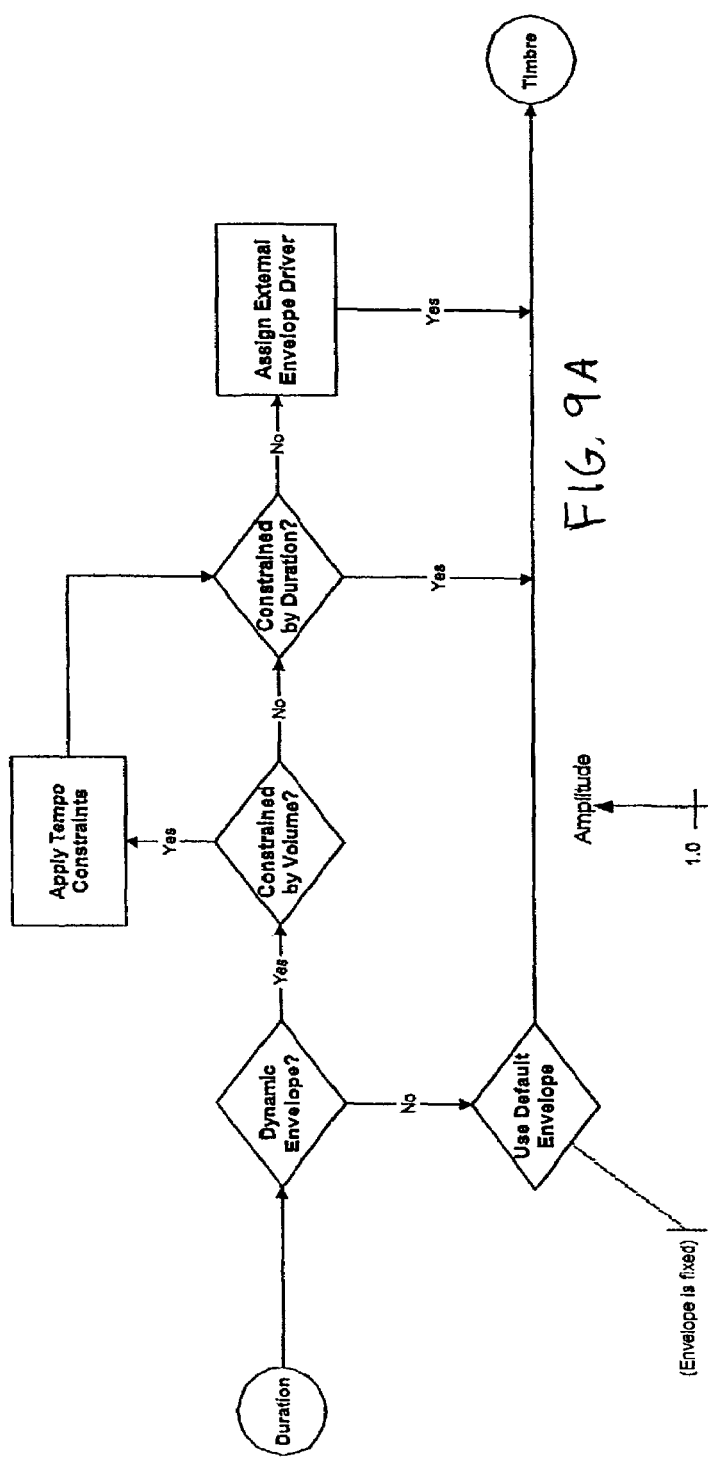
Figure 9B:
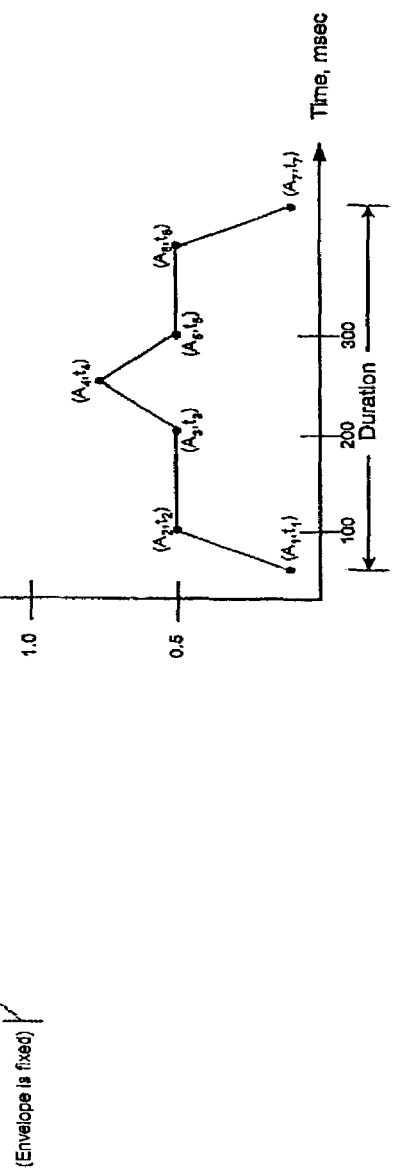
Figure 10A:
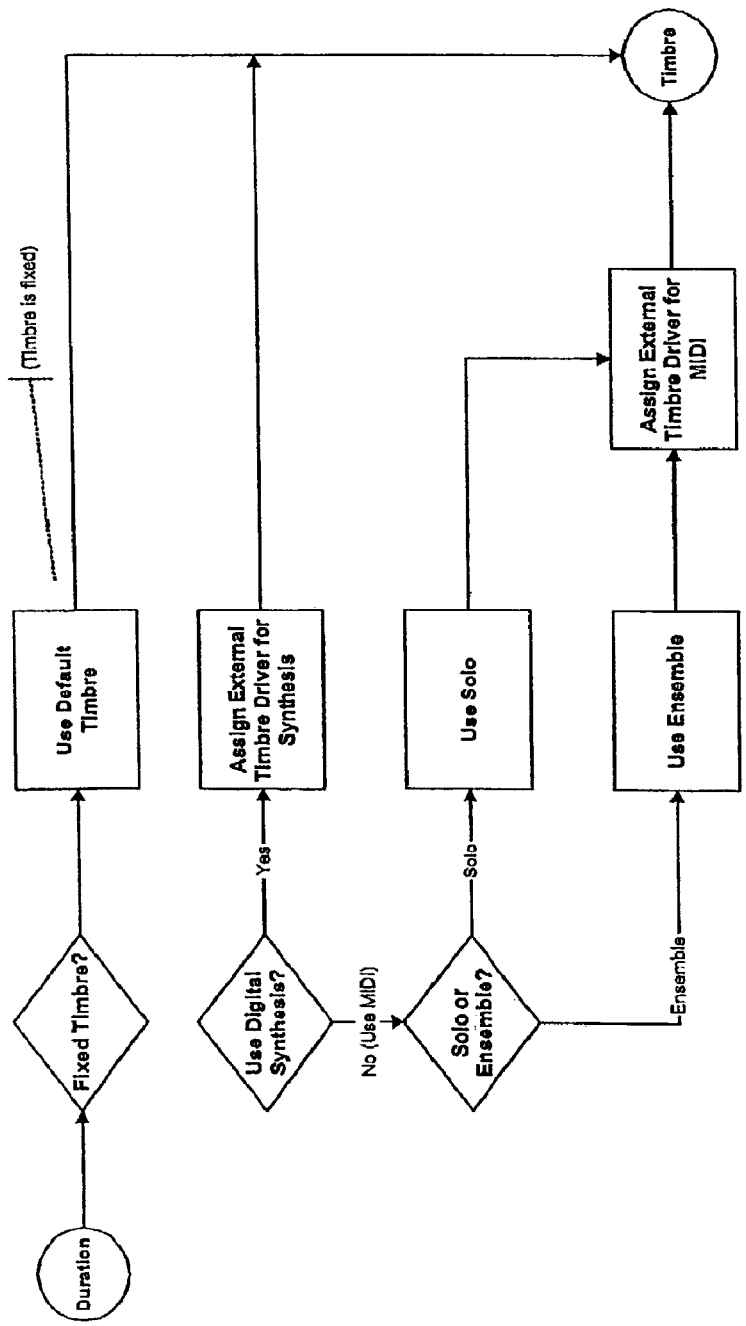
Figure 10B:
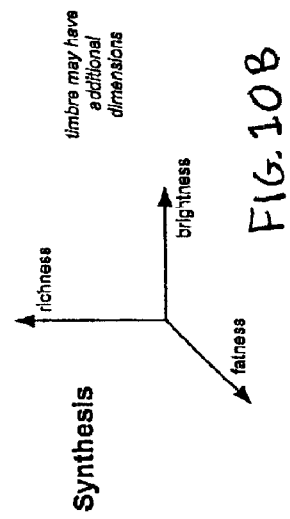
Figure 11A:
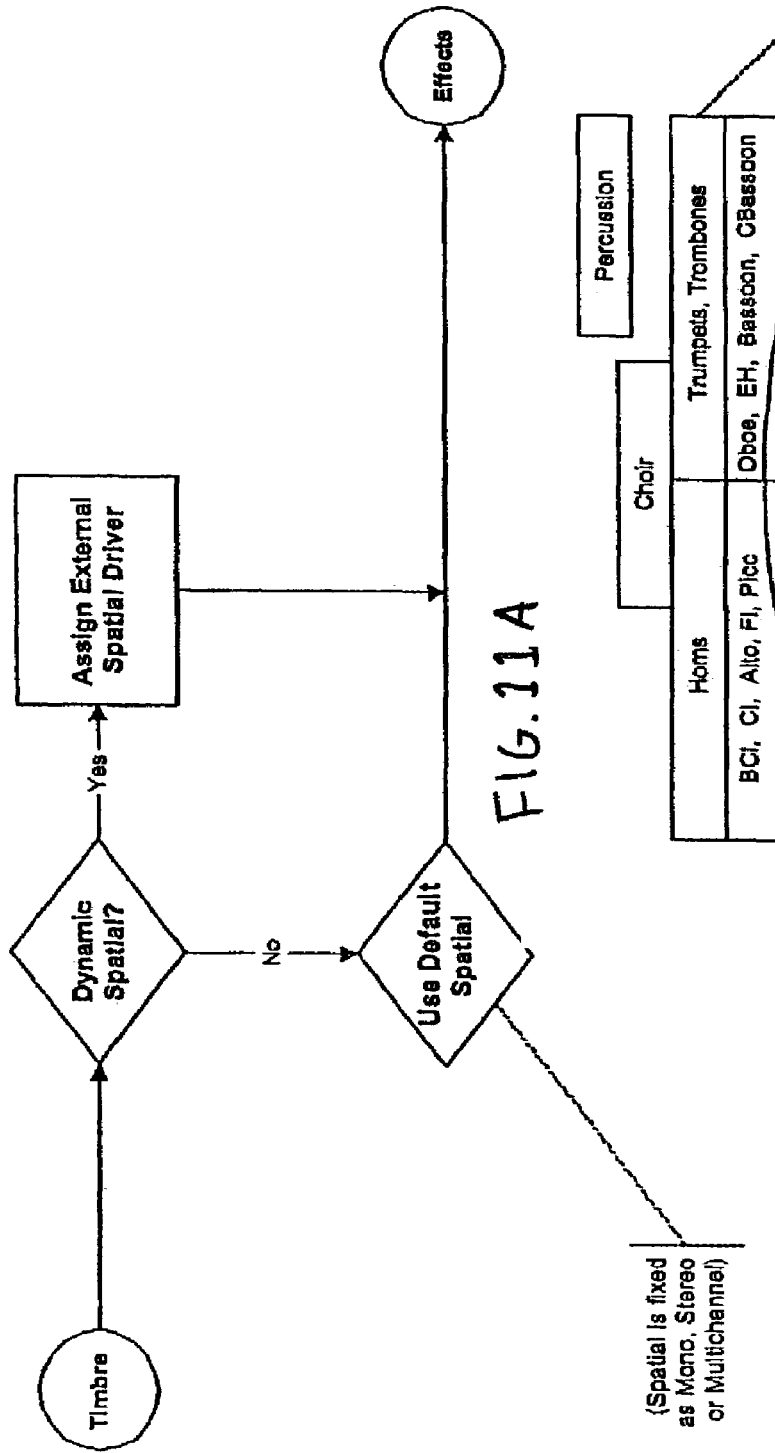
Figure 11B:
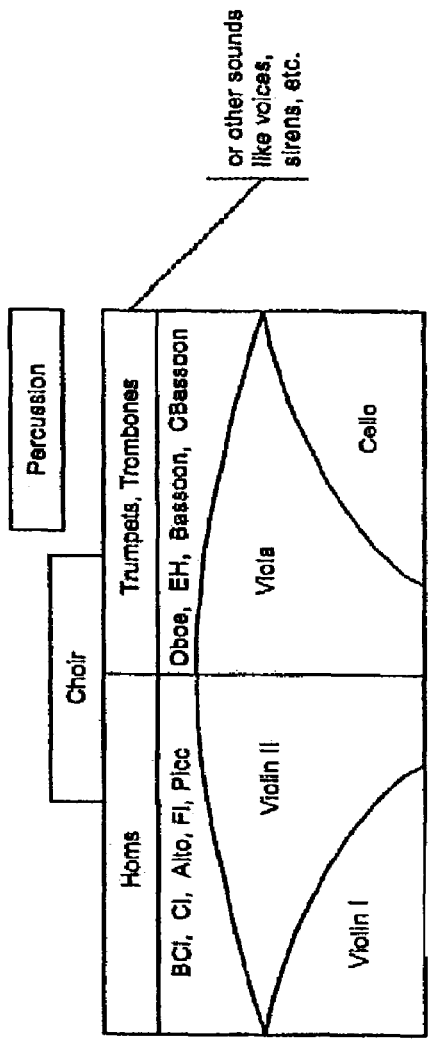
Figure 12:

Embodiments of the present invention are directed to musical sonification of complex data streams within various types of data domains, as will be described in greater detail below. Musical sonification provides a data transformation such that the relations in the data are manifested in corresponding musical relations. The musical sonification preferably generates "pleasing" musical sounds that yield a high degree of human perception of the underlying data stream, thereby increasing data perception bandwidth. As used herein, "music" or "musical" refers to the science or art of ordering tones or sounds in succession, in combination, and in temporal relationships to produce a composition having unity and continuity. Although the music used in the present invention is preferably common-practice music and the exemplary embodiments of the present invention use western musical concepts to produce pleasing musical sounds, the terms "music" and "musical" are not to be limited to any particular style or type of music.

Referring to FIG. 1, one embodiment of the musical sonification system and method 10 is based on three main conceptual stages: (1) a data input acquisition stage 12; (2) a data to sound mapping stage 14; and (3) a sonification stage 16. The data acquisition stage 12 is based on details of context-specific data sources, formats, and protocols. During the data acquisition stage 12, as shown in FIG. 2, a data domain expert user selects known data sources or streams 20 from within a graphical environment. The outflow from the execution of data acquisition is a description of one or more specific data inputs 22 based on the data streams 20. In the financial trading industry, for example, data streams 20 include industry-standard market data feeds from leading providers of equity securities or other financial data. Unspecified data sources may also be supported by providing for user-generated data input specifications that describe the data stream.

In addition to selecting the data for sonifying, the user associates the data with a purpose by selecting an operating mode, for example, based on the desired sonification strategy suited to the data stream. Examples of operating modes include, without limitation, an alert mode, an individual mode and a relationship mode. The alert mode provides event-based alerts such as exceptions, triggers, and/or thresholds. The individual mode provides continuous single point individual data stream monitoring in which all points are distinguishable. The relationship mode provides continuous sonification of the relationship between several individual data streams.

In the mapping stage 14, the user establishes the appropriate musical rendering of the desired data. For example, the user is queried about data relationships, preferred musical styles, sound samples, and other data characteristics or preferences. The perception of sound is highly individualized, and the user benefits from guidance and assistance in obtaining the most pleasing and useable configuration of sound mappings. In various embodiments, the user can select sound schemes and approaches that reflect his or her individual preferences and listening style.

In one embodiment, completion of the data to sound mapping stage yields sound parameters, as shown in FIG. 3, which are preferably suitable for real-time digital audio synthesis or MIDI. The sound parameters correspond to sound characteristics, such as pitch, volume, time signature, tempo, duration, envelope, timbre, space, and effects. Examples of data to sound mappings for different sound characteristics are shown in FIGS. 4-12. The flow charts illustrate the process for mapping data parameters to the sound parameters and the graphs illustrate relationships between the input values and the sound parameters. Some data, such as tempo mapped data, may not depend on discrete data values. Also, some data may be mapped to specific musical notes (i.e., specific values of pitch, duration, envelope, etc.).

In the sonification stage 16, the mapped data is sonified to produce an audio signal output corresponding to the data stream. The sonification stage 16 can be managed using various rules, data transformations, and algorithms to provide sound consistent with individual user preferences and styles, as will be described in greater detail below. Different sound streams can be "created" based on the user input and can be started and stopped individually or together. Alternatively, the sound streams may start or stop automatically based on threshold data levels set by the user.

Figure 13:
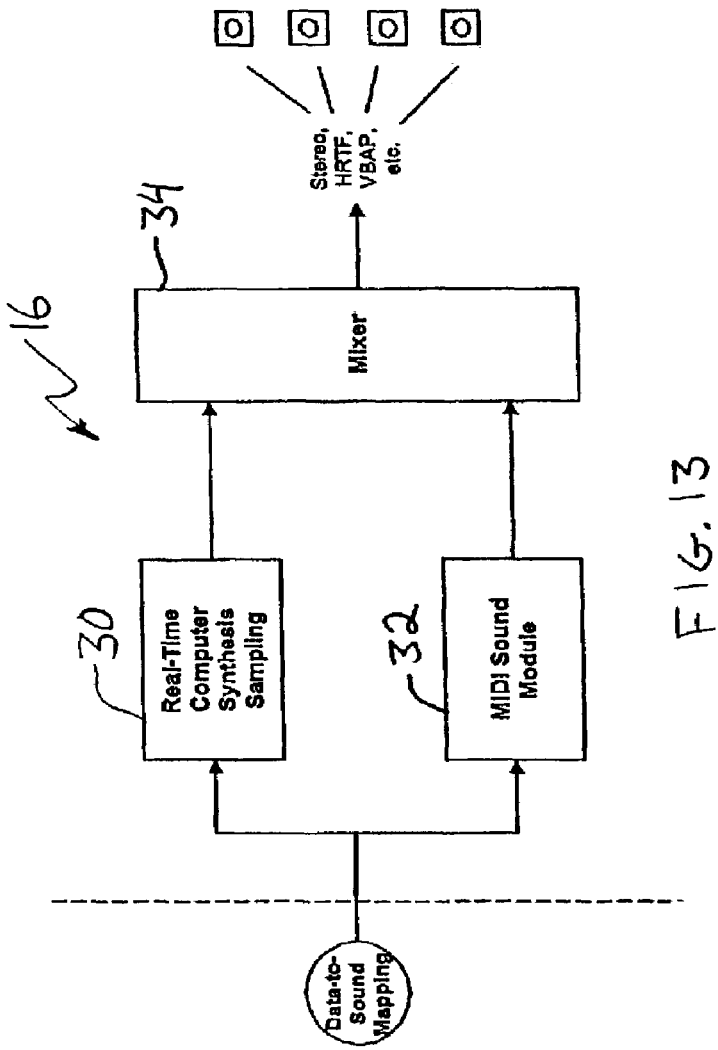
FIG. 13 is a functional block diagram of one embodiment of the mapped sound sonification.

Referring to FIG. 13, one embodiment of the sonification stage 16 uses real-time computer synthesis sampling 30 and/or a MIDI sound module 32 to generate the audio output signal. A mixer style interface 34 can be used to allow the user to adjust various sound characteristics such as levels, spatialization, register, tone control, and the like, to his or her own liking. The sonification stage 16 can also include a "capture" feature, which can be started and stopped to save a sound stream for later historical listening or scrutiny. The "captured" sound stream can be played back at various speeds, which retain the musical quality of the sound stream.

The musical sonification stage 16 can involve various types of sound processing to produce the musical renderings of the data. Examples of sound processing include, without limitation, digital audio synthesis using circuits made up of unit generators (additive/subtractive synthesis, FM, filtering, etc.); physical modeling synthesis that may provide ambient or natural sounds; MIDI (musical note information sent to an on-board MIDI synthesizer); musical manipulation/distortion using background music that distorts, changes, speeds up, gets louder, etc. in accordance with the data conditions; spectral cross synthesis that allows one musical track to control or manipulate another using spectral manipulation; and direct rendering of a digital input stream.

Other embodiments also may include a coordinate visual display (not shown). Such a visual display may be used in contexts such as training an operator to be able to monitor a data stream while the sonification process is running.

Figure 14:
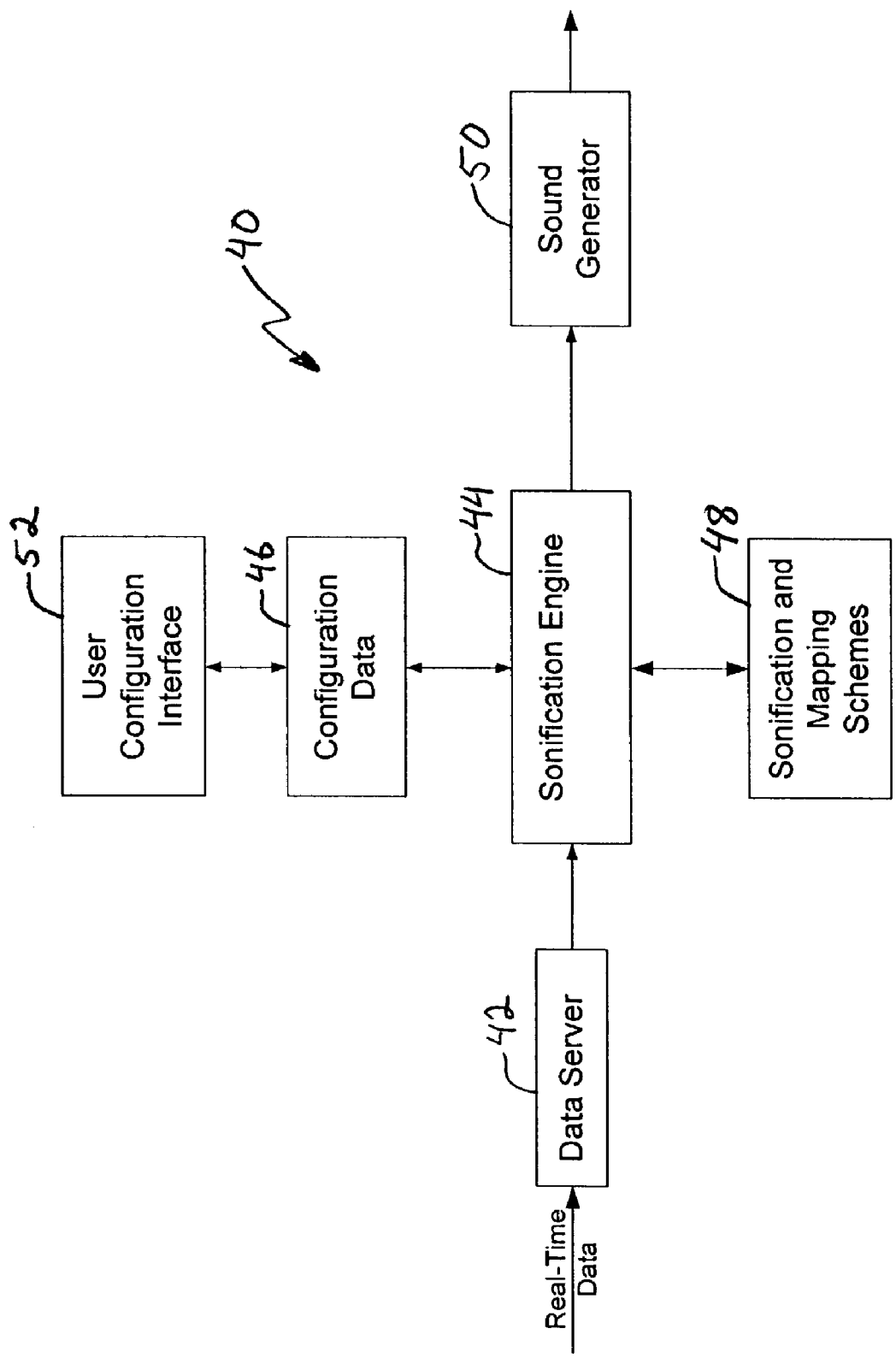
FIG. 14 is a functional block diagram of a system for musical sonification of a data stream, according to another embodiment of the present invention.

Referring to FIG. 14, an exemplary embodiment of the musical sonification system 40 is described in greater detail. In general, a data server 42 receives a real-time data stream from a data source and passes data input values from the data stream to a sonification engine 44 in real time. The sonification system 40 includes configuration data 46 and at least one sonification and mapping scheme 48. The sonification and mapping scheme 48 maps data parameters to sound parameters to form musical renderings of mapped data. Based on the configuration data 46 and the sonification and mapping scheme 48, the sonification engine 44 converts the data input values corresponding to mapped data into corresponding sound parameters. A sound generator 50 generates an audio signal output from the corresponding sound parameters. The audio signal output includes a musical rendering of the mapped data in the data stream.

The data server 42 can execute as an independent cooperating process either locally or remotely. In the exemplary embodiment, real-time data streams include financial market data and the data server 42 supports one or more public and/or private market data sources. The market data sources can be industry standard data sources including, but not limited to, Bloomberg, TIBCO Rendezvous (Reuters), and Microsoft Biztalk server. The system can also support a direct data feed for bid/ask treasuries data or treasuries futures data.

In one embodiment, a Bloomberg data server can be implemented as a Visual Basic application using sample code provided in the Bloomberg developer's API. In another embodiment, a TIBCO Data Listener can be implemented in Java (or another supported language) using sample code supplied by Reuters. Other implementations of the data server 42 are contemplated based on other data sources including, but not limited to, sockets, data busses, and XML.

The configuration data 46 is preferably stored in a configuration file, which can be created and edited manually or with a user configuration interface 52. The user configuration interface 52 preferably obtains the configuration data 46 upon installation of the sonification system. Configuration data 46 generally includes information related to the data being sonified, such as user-defined thresholds (e.g., relating to data movement or relationships), anticipated data ranges, plausible data ranges, musical metaphors, and data volatility. Configuration data 46 also includes information related to listening preferences, such as sonic affinities, favorite instruments, and preferred musical styles.

In the exemplary embodiment, configuration data 46 can include: trading style and process configuration data such as significant movement thresholds, significant bid/ask thresholds, and anticipated data ranges; data stream behavior configuration data such as plausible data ranges, musical metaphors, and data volatility; and listening preference data such as sonic affinities, favorite instruments, and musical style. The user configuration interface 52 can include configuration wizards to obtain these different types of configuration data, such as a trading style wizard, a data setup wizard, and a sound personalization wizard. The trading style wizard can lead the user through an interview that facilitates characterization of the user's trading environment, vehicles and style. The data streams in different environments (e.g., proprietary traders, asset managers, fixed income, equities, derivatives, commodities, etc.) possess different characteristics, which may require unique sonification strategies. The data setup wizard can be used to select a data source (e.g., a security or market index) and specify data items (e.g., fields) from within the data source. Based on knowledge and characterization of the data source, the sonification system can be appropriately configured. The sound personalization wizard interviews the user to allow the user to configure sound and music preferences.

The sonification and mapping scheme 48 is preferably selected from a plurality of predefined sonification and mapping schemes. The sonification and mapping schemes are designed based on the different types of data and relationships between the data to optimize the user's perception for various situations and data streams. The sonification and mapping schemes can use metaphors such that certain types of data or types of events are associated with certain types of sounds or musical characteristics. In the exemplary embodiment, different sonification and mapping schemes can be defined based on different sonification strategies suited to different trading styles and/or market data sources (e.g., different securities or market indices).

The sonification and mapping schemes are also preferably designed based on the relations and organizations that characterize music. In the exemplary embodiment, the sonification and mapping schemes use western musical concepts, such as harmony, dissonance, recurring melodies, chord progressions, and the equally tempered scale. Each sonification and mapping scheme defines a sound type that determines the type of sound (e.g., the instrument) to be played based on the type of data and a mapping scheme that determines how the sounds are played (e.g., the melody) based on the data relationships. The sonification and mapping schemes can be implemented in any programming language using known software such as, for example, the Java-based sound synthesis software available under the name JSyn from SoftSynth. Other types of sound synthesis software can also be used.

The sound types include, but are not limited to, sampled sound types (e.g., recordings of acoustic instruments such as a bassoon, violin, harp, clarinet, gamelan, xylophone, etc.) and synthesized sound types, such as FM (frequency modulation) instrument synthesis and triangle oscillator synthesis. In the exemplary embodiment, different sound types (e.g., instruments) are preferably used to distinguish between different data streams and metaphors can be used such that certain types of data are associated with certain types of sound. For example, a bassoon sound type can be used to sonify the Dow Jones Industrial Average, an electronic oscillator sound type can be used to sonify the Nasdaq, and a piano sound type can be used to sonify the S&P 500. In one implementation, different instruments can be programmed using classes provided by the JSyn Java API.

Figure 15:
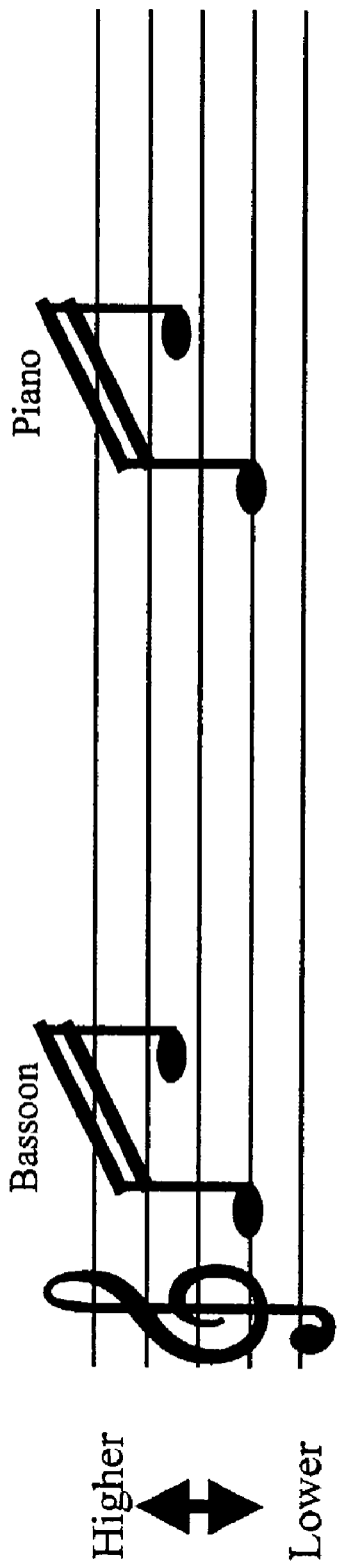
FIG. 15 illustrates musical notations for a discrete sonification used in one type of sonification and mapping scheme.

The mapping schemes are preferably based on discrete musical sonification, continuous musical sonification, global musical sonification, or a combination thereof. According to discrete musical sonification, data parameters representing an event (e.g., a bid/ask or a price movement) are mapped to a predefined number of musical notes (e.g., a melodic fragment or tremolando) to musically convey the event. Musical relations, such as interval and trill length, are used to express the relationships between the data. Referring to FIG. 15, two note melodic fragments are shown with different sound types (e.g., instrumental voices) representing different data streams and with pitch representing data change or movement.

Figure 16:
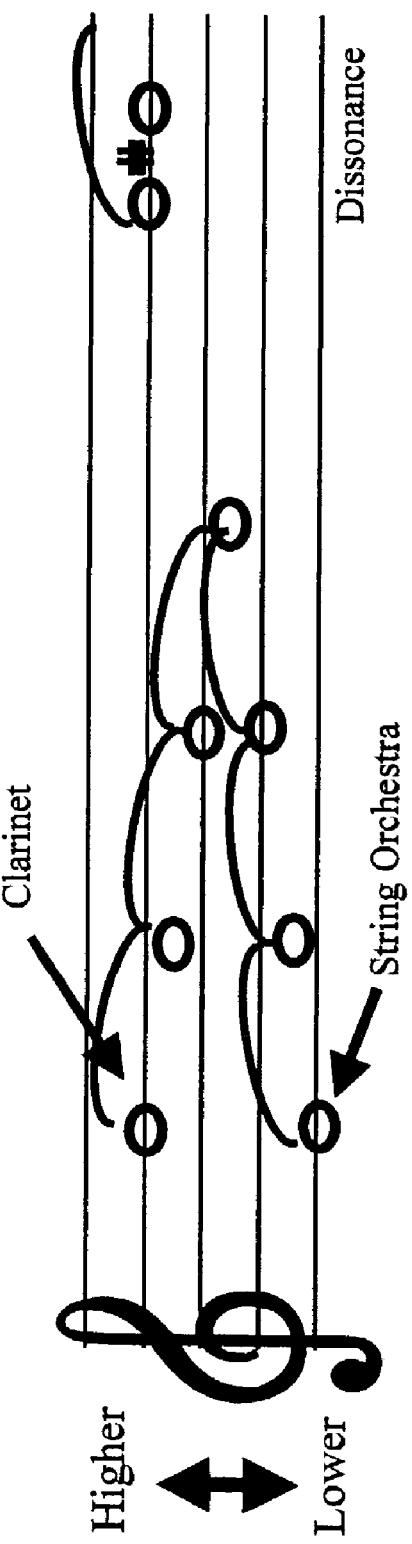
FIG. 16 illustrates musical notations for a continuous sonification used in another type of sonification and mapping scheme.

According to continuous musical sonification, data parameters are continuously mapped to musical notes to convey data behavior and relationships continuously. Referring to FIG. 16, a continuous sonification is shown with different sound types or voices representing different data streams. In this continuous sonification, pitch is used to represent a relationship between the data streams, such as the relative distance between technical analysis variables relating to technical analysis performed on the data based on computational models of how the data behaves. The different data streams may be harmonized until they converge and dissonance demonstrates convergence. Volume can be used in this continuous sonification to indicate when the different data streams approach each other or to indicate when a data stream approaches user-defined anticipated ranges or significant events.

According to global musical sonification, a musical composition having multiple voices is used to convey a global picture of the data. According to one example of global musical sonification, discrete and continuous sonification techniques can be combined to convey a global picture of the data.

According to another example of global musical sonification, data parameters are mapped to a musical composition having multiple voices such that the musical composition is altered to convey the deviation of the data from an expected data analysis model. The data analysis model predicts relationships between certain data values. A baseline musical composition is used when the data analysis model agrees with the actual data. The relationships between these data values in the data analysis model and the actual data are mapped to sound parameters in the baseline musical composition. The relationships are sonified by changing these sound parameters and manipulating musical characteristics, such as melody, harmony, orchestration, and rhythm, in the baseline musical composition. When listening to a musical composition having multiple voices, such as an orchestra or an ensemble, the listener is able to perceive the musical composition as a whole or globally. Thus, each degree and type of difference between the data values can be discernible, not necessarily as a difference in the sound produced by the sound parameter corresponding to the individual data value, but by the effect of the difference on the global musical picture. With training, the user recognizes different global sounds in the musical composition and is able to hear discrepancies between the model predictions and the actual values.

Specific examples of sonification and mapping schemes using the chromatic scale to map financial market data are described below. These examples are given for exemplary purposes and are not considered to be a limitation of present invention.

EXAMPLE 1

Three Note Melodic Fragment

Referring to FIG. 17, a three note melodic fragment represents the price and change in price of a stock, bond or market average. The first note is a reference tone that remains at the same pitch representing the opening price. The second and third notes are the immediately previous and current value. The difference or interval between the second and third notes and the reference tone is based on a significant movement threshold set by the user. For example, if the Dow Jones Average opens at 8000 and the significant movement is set to 25 points, the user will hear the reference note 70a, followed by a second note 70b of the same pitch as the reference note, followed by a third note 70c one half step higher. If the Dow Jones Average moves to 8050, the user will hear the reference note 72a followed by a second note 72b one half step above the reference note, followed by a third note 72c one whole step above the reference note.

EXAMPLE 2

Two Note Tick Indicator

A two note tick indicator represents a movement of a security. The first note is always the same and the second note indicates an uptick or a down tick. When there is an uptick of a significant movement, the second note is one half step higher than the first note. When there is a downtick of a significant movement, the second note is one half step lower than the first note. If the security moves by more than one significant movement, the two note indicator is repeated (e.g., up to a maximum of five times).

EXAMPLE 3

Bid/Ask Tremolando

Referring to FIGS. 18 and 19, a series of alternating notes (i.e., tremolando) represents a bid or ask. The length of the trill (i.e., the number of alternating notes) is proportional to the relative size of the bid or ask. The difference in pitch between trill notes 80, 82 is proportional to the spread between bid price and ask price. Pitch is also used to indicate whether or not it is a bid or ask. If a higher note 84a persists, the tremolando represents an ask (FIG. 18). If a lower note 84b persists, the tremolando represents a bid (FIG. 19).

EXAMPLE 4

Three Note Melodic Fragment with Overtones

If the movement of a security exceeds 12 significant movements in a positive or negative direction, overtones are added to the second and third tones of a three note melodic fragment, such as described above. An overtone is a tone having a frequency that is an integral multiple of the reference tone. If the security moves more than 12 significant movements up, the first overtone (added to the second tone) is at a frequency twice that of the reference tone (i.e., one octave higher) and the second overtone (added to the third tone) is at a frequency three times that of the reference tone (i.e., one octave plus one fifth). If the security moves more than 12 significant movements down, the first overtone is at one-half the frequency of the reference tone (i.e., one octave down).

EXAMPLE 5

Three Note Melodic Fragment with Moving Average Indicator

A moving average indicator can be used with a three note melodic fragment, such as described above. The user may select from a 30, 50 or 200 day moving average. If the price of the security moves within 12 significant movements of the selected average, a fourth note sounds with a pitch based on the difference between the opening price and the average. The duration and loudness of the fourth note increases for every significant movement closer to the average. If the average is crossed, a long tone sounds.

EXAMPLE 6

Moving Average Indicator

A moving average indicator can be used without a melodic fragment to represent the moving market average. If the price of a security or index moves within 12 significant movements of the selected average, a note sounds with a pitch based on the difference between the opening price and the average. The duration and loudness of the note increases for every significant movement closer to the average. If the average is crossed, a long tone sounds. If no securities or indices are near their moving average, the user will hear nothing. As the securities or indices move closer to their moving averages, the sonification can become continuous.

EXAMPLE 7

Moving Average Continuous Sonification

Figure 20:
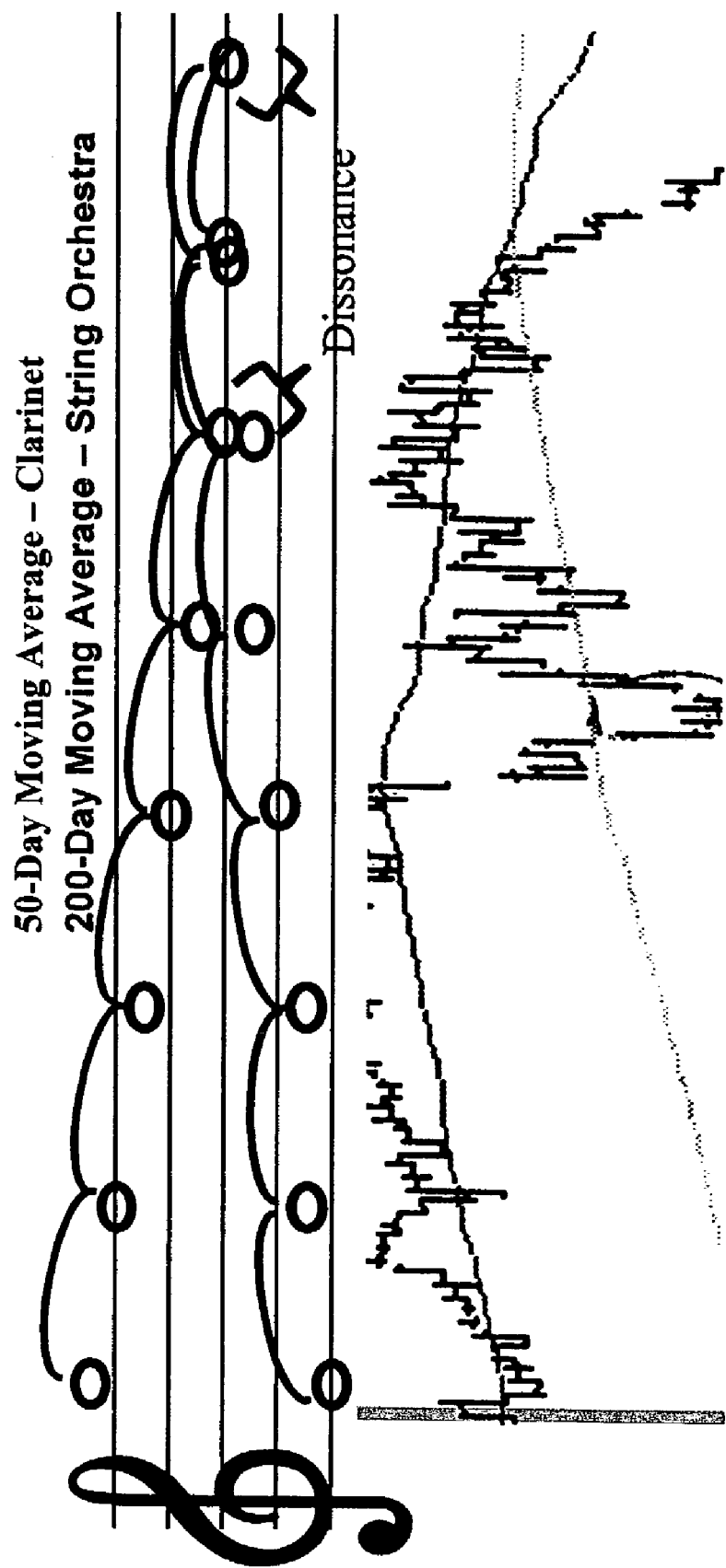

Referring to FIG. 20, a continuous sonification represents moving averages directly. Different moving averages are mapped to different sound types or voices, for example, the 50-Day Moving Average is represented by a clarinet and the 200-Day Moving Average is represented by a string orchestra. The moving averages are mapped to pitch such that the moving averages are harmonized until they converge and dissonance indicates the convergence. The relative distance between the moving averages can also be mapped to volume such that the volume increases as the moving averages approach each other.

EXAMPLE 8

Global Musical Sonification

A complicated financial model developed by an investment bank predicts the relationship between 20 to 30 key values. A known piece or style of music is played and controlled computationally by the key data values from the financial model. If the financial model is performing as expected, the music sounds "normal." If the financial model departs from the expected behavior, the music sounds "abnormal" based on a musical manipulation or distortion, for example, notes being out of tune, accelerated or decelerated tempo, certain instruments more prominent than other, transposition from a major key to a minor key, and dissonance.

Numerous other sonification and mapping schemes are also contemplated using other types of sound parameters and/or musical characteristics including, but not limited to, style, duration, tone, decay, instrument, loudness, pitch, melody, rhythm, harmony, attack, and effects.

The sonification engine 44 reads the configuration data 46 and selects the data stream to be sonified and the sonification and mapping scheme 48 to be used based on the configuration data 46. The sonification engine 44 preferably reads the configuration file upon start-up and sends the appropriate configuration data related to the data stream(s) to the data server 42. In the exemplary embodiment, the list of securities to be sonified and the fields (e.g., price, volume, 30 day average, bid price, ask price, etc.) for each security are read from the configuration file. The preferred embodiment of the sonification engine 44 automatically selects the most appropriate sonification and mapping scheme 48 for the data stream to be sonified based on the configuration data 46.

To begin the sonification, the sonification engine connects to the data server 42. When the sonification engine 44 receives data from the data server 42, the sonification engine 44 converts the data input values into sound parameters based on the selected sonification and mapping scheme 48 and the configuration data 46. In one example, the data input values are compared to the data thresholds in the configuration data 46 and the sound parameters are calculated based on the data values meeting the data thresholds. The calculated sound parameters are then used to set up the instruments or sound synthesizer to create the notes having the appropriate sound type and arrangement, as defined by the sonification and mapping scheme.

In one embodiment, the sonification engine 44 can be implemented in using an object-oriented programming language, such as Java. In this embodiment, sonification threads are created for processing data streams and low level sound production is handled by Java-based sound synthesis software, such as the JSyn API. Other examples of APIs that can be used for sonification include, but are not limited to, JMSL, SMS, and STK.

A sonification thread is preferably established for each data stream (e.g., each security or market index) to be sonified. According to one algorithm for processing the data using this implementation, the main thread of the sonification client waits for data to arrive from the data server(s) 48. When the data arrives, the ID of the data stream is checked. If the ID of the data stream matches that of an existing sonification thread, the data values are dispatched to that thread, which will respond, according to its type, with the selected sonification and mapping scheme. Once the sonification thread receives the data, the thread compares the data input values with the thresholds. If the thresholds are met, sound parameters (e.g., the pitch, duration, and loudness of notes) are calculated and used to set up the instruments (e.g., the JSyn based instruments). The instruments are activated and send out the appropriate sounds via the sound generator 50.

The sound generator 50 can be implemented with known hardware, such as soundcards and digital to analog converters, and supporting software. The sound generator 50 can also include a mixer for controlling the audio output signal. The sound generator 50 physically conveys the sound to the listener by means of speakers, binaural headphones, or any other sound delivery mechanism. One embodiment of the headphones preferably allow the listener to hear normal conversation while listening to the sonification. More advanced sound spatialization and localization techniques can also be used, including but not limited to, HRTF (head-related transfer functions) processing, amplitude panning, vector base amplitude panning (VBAP), and wave field synthesis.

One advantage of the musical sonification system of the present invention is the mapping of data to pleasing musical sounds that the listener enjoys. This facilitates passive learning and auditory pattern recognition even when the listener has no musical training. The sonification and mapping schemes are preferably designed using principles of musical composition and techniques for generating pleasing musical sounds. One example of musical composition principles that may be applied to the musical sonification of data are the data to sound mappings in the 1957 composition Achorripsis by Iannis Xenakis, as described in the related provisional application Ser. No. 60/399,284, which is fully incorporated herein by reference. Theories of musical sonification design are also described in greater detail by Edward Childs, Ph.D. in his Thesis entitled "MUSICAL SONIFICATION DESIGN" (published in the Dartmouth College Library in May 2003), which is fully incorporated herein by reference. Although specific examples of musical sonification are described herein, other musical sonifications are within the scope of the present invention.

The musical sonification system also provides a number of advantages when used in the area of financial trading. The visual displays can be augmented with auditory displays to leverage the underutilized human cognitive auditory capabilities to process sound while performing other tasks. Because of the human cognitive ability to process voice, music and natural sounds concurrently and independently, the trader can have a conversation while listening to the musical sonification. An omni-directional auditory display also allows the trader to be away from the desk while monitoring the market. The musical sonifications deliver an improved ability to perceive patterns and changes in primary market data as well as in secondary data, while reducing visual data overload.

Although the exemplary embodiment described above relates primarily to the musical sonification of real-time financial market data, other applications of the system and method of musical sonification are also within the scope of the present invention. Instead of sonifying a real-time data stream, historical data can be sonified. For example, financial market historical data that has been recorded over a long period of time can be sonified and played back at a faster speed in a much shorter period of time.

The musical sonification system and method can be used to map any type of data in any data-overload situation. Other types of data that can be musically sonified include, but are not limited to, medical record data, network data, security data, manufacturing process data, weather data, air traffic control data, and fluid flow data. In one example, musical sonification can be used in the field of computational fluid dynamics (CFD) to depict convergence behavior, scan large amounts of data with low activity, or codify global events in the flow field, as described in greater detail in the related provisional application Ser. No. 60/399,284, which is fully incorporated herein by reference. In another example, musical sonification can be used in the field of meteorological data, as described in greater detail by Edward Childs, Ph.D. in his Thesis entitled "MUSICAL SONIFICATION DESIGN" (published in the Dartmouth College Library in May 2003), which is fully incorporated herein by reference.

Embodiments of the invention may be implemented in any conventional computer programming language. For example, preferred embodiments may be implemented in a procedural programming language (e.g., "C") or an object oriented programming language (e.g., "C++" or Java). Alternative embodiments of the invention may be implemented as pre-programmed hardware elements, other related components, or as a combination of hardware and software components.

Embodiments can be implemented as a computer program product for use with a computer system including, but not limited to, a PC or a mobile device. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What is claimed is:

1. A method for musical sonification of data to monitor the data, the method comprising:

receiving at least one data stream including data values representing a series of events;

determining that received data values represent events to be sonified;

in response to determining events to be sonified, determining corresponding sonifications associated with the events to be sonified, wherein at least some of the sonifications include a musical arrangement of notes that musically convey the event, wherein the musical arrangement of notes includes a melodic fragment indicative of a data movement event, the melodic fragment including at least three notes, wherein one of the notes is a reference note and others of the notes are indicative of previous and current data values, respectively; and generating an audio signal output corresponding to a series of sonifications determined for at least some of the events in the data stream to produce a musical rendering of the data stream.

2. The method of claim 1 wherein the musical arrangement further includes a fourth note indicative of a target value, wherein a duration of the fourth note increases as the data values approach the target value.

3. The method of claim 2 wherein the target value is a moving average of the data values.

4. The method of claim 1 wherein the musical arrangement of notes is based on an equally tempered scale.

5. A machine-readable medium whose contents cause a computer system to perform a method for musical sonification of data to monitor the data, the method comprising:

receiving at least one data stream including data values representing a series of events;

determining that received data values represent events to be sonified;

in response to determining events to be sonified, determining corresponding sonifications associated with the events to be sonified, wherein at least some of the sonifications include a musical arrangement of notes that musically convey the event, wherein the musical arrangement of notes includes a melodic fragment indicative of a data movement event, the melodic fragment including at least three notes, wherein one of the notes is a reference note and others of the notes are indicative of previous and current data values, respectively; and generating an audio signal output corresponding to a series of sonifications determined for at least some of the events in the data stream to produce a musical rendering of the data stream.

6. The machine-readable medium of claim 5 wherein the musical arrangement of notes is based on an equally tempered scale.

7. The machine-readable medium of claim 5 wherein the musical arrangement further includes a fourth note indicative of a target value, wherein a duration of the fourth note increases as the data values approach the target value.

8. The machine-readable medium of claim 7 wherein the target value is a moving average of the data values.

9. A system for musical sonification of data to monitor the data, the system comprising:

means for receiving at least one data stream including data values representing a series of events;

means for determining that received data values represent events to be sonified and in response to determining events to be sonified, for determining corresponding sonifications associated with the events to be sonified, wherein at least some of the sonifications include a musical arrangement of notes that musically convey the event, wherein the musical arrangement of notes includes a melodic fragment indicative of a data movement event, the melodic fragment including at least three notes, wherein one of the notes is a reference note and others of the notes are indicative of previous and current data values, respectively; and means for generating an audio signal output corresponding to a series of sonifications determined for at least some of the events in the data stream to produce a musical rendering of the data stream.

10. The system of claim 9 wherein the musical arrangement of notes is based on an equally tempered scale.

11. The system of claim 9 wherein the musical arrangement further includes a fourth note indicative of a target value, wherein a duration of the fourth note increases as the data values approach the target value.

12. The system of claim 11 wherein the target value is a moving average of the data values.

13. A method for musical sonification of data to monitor the data, the method comprising:
- receiving at least one data stream including data values representing a series of events;
- determining that received data values represent events to be sonified;
- in response to determining events to be sonified, determining corresponding sonifications associated with the events to be sonified, wherein at least some of the sonifications include a musical arrangement of notes that musically convey the event, wherein the musical arrangement of notes includes a series of alternating notes indicative of an event, wherein the number of the series of alternating notes is indicative of a relative size of the event, and wherein a last note of the series of alternating notes being higher or lower than a previous note is indicative of a type of the event; and
- generating an audio signal output corresponding to a series of sonifications determined for at least some of the events in the data stream to produce a musical rendering of the data stream.

14. A machine-readable medium whose contents cause a computer system to perform a method for musical sonification of data to monitor the data, the method comprising:
- receiving at least one data stream including data values representing a series of events;
- determining that received data values represent events to be sonified;
- in response to determining events to be sonified, determining corresponding sonifications associated with the events to be sonified, wherein at least some of the sonifications include a musical arrangement of notes that musically convey the event, wherein the musical arrangement of notes includes a series of alternating notes indicative of an event, wherein the number of the series of alternating notes is indicative of a relative size of the event, and wherein a last note of the series of alternating notes being higher or lower than a previous note is indicative of a type of the event; and
- generating an audio signal output corresponding to a series of sonifications determined for at least some of the events in the data stream to produce a musical rendering of the data stream.

15. A system for musical sonification of data to monitor the data, the system comprising:
- means for receiving at least one data stream including data values representing a series of events;
- means for determining that received data values represent events to be sonified and in response to determining events to be sonified, for determining corresponding sonifications associated with the events to be sonified, wherein at least some of the sonifications include a musical arrangement of notes that musically convey the event, wherein the musical arrangement of notes includes a series of alternating notes indicative of an event, wherein the number of the series of alternating notes is indicative of a relative size of the event, and wherein a last note of the series of alternating notes being higher or lower than a previous note is indicative of a type of the event; and
- means for generating an audio signal output corresponding to a series of sonifications determined for at least some of the events in the data stream to produce a musical rendering of the data stream.

* * * * *